(12) United States Patent
Johnson

(10) Patent No.: US 7,983,277 B1
(45) Date of Patent: Jul. 19, 2011

(54) SYSTEM AND METHOD FOR CREATING A SECURE CONNECTION OVER AN MPLS NETWORK

(75) Inventor: Harold W. Johnson, Roach, MO (US)

(73) Assignee: Sprint Communications Company L.P., Overland Park, KS (US)

(*) Notice: Subject to any disclaimer, the term of this patent is extended or adjusted under 35 U.S.C. 154(b) by 763 days.

(21) Appl. No.: 11/289,896

(22) Filed: Nov. 30, 2005

(51) Int. Cl.
*H04L 12/28* (2006.01)
*H04L 12/56* (2006.01)
*H04L 12/66* (2006.01)

(52) U.S. Cl. ..... 370/401; 370/352; 370/389; 370/395.1; 370/466

(58) Field of Classification Search ........... 370/352, 370/389, 395, 401, 466
See application file for complete search history.

(56) References Cited

U.S. PATENT DOCUMENTS

| | | | |
|---|---|---|---|
| 6,826,368 B1 * | 11/2004 | Koren et al. | 398/50 |
| 7,082,140 B1 * | 7/2006 | Hass | 370/466 |
| 7,221,675 B2 * | 5/2007 | Bryden et al. | 370/392 |
| 7,680,952 B1 * | 3/2010 | Pan et al. | 709/239 |
| 2002/0110087 A1 * | 8/2002 | Zelig et al. | 370/236 |
| 2004/0076166 A1 * | 4/2004 | Patenaude | 370/401 |
| 2004/0184803 A1 * | 9/2004 | Chang et al. | 398/58 |
| 2005/0008013 A1 * | 1/2005 | Jamieson et al. | 370/389 |
| 2005/0089032 A1 * | 4/2005 | Shankar | 370/389 |
| 2005/0190789 A1 * | 9/2005 | Salkini et al. | 370/466 |
| 2006/0123225 A1 * | 6/2006 | Sharma et al. | 713/153 |
| 2006/0128428 A1 * | 6/2006 | Rooyen | 455/553.1 |
| 2006/0153496 A1 * | 7/2006 | Tanobe et al. | 385/24 |
| 2007/0019956 A1 * | 1/2007 | Sorin et al. | 398/71 |
| 2007/0030851 A1 * | 2/2007 | Sinicrope et al. | 370/392 |
| 2007/0053366 A1 * | 3/2007 | Booth et al. | 370/400 |
| 2007/0058666 A1 * | 3/2007 | Pratt | 370/463 |
| 2007/0071029 A1 * | 3/2007 | White et al. | 370/466 |
| 2008/0019358 A1 * | 1/2008 | Rijsman | 370/389 |
| 2008/0046597 A1 * | 2/2008 | Stademann et al. | 709/249 |

* cited by examiner

*Primary Examiner* — Hong Cho
*Assistant Examiner* — Lonnie Sweet

(57) ABSTRACT

A system and method for creating a secure link across an MPLS network is disclosed. An entry point into a communication system is mapped directly to a router in an MPLS network. The router attaches MPLS labels onto communication packets received from the entry point and transmits the packets across the MPLS network to a destination associated with the entry point. The router ignores any IP address contained in the packets when routing the packets through the MPLS network.

23 Claims, 4 Drawing Sheets

SYSTEM AND METHOD FOR CREATING A SECURE CONNECTION OVER AN MPLS NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication network architectures and services.

2. Description of the Prior Art

The availability of MultiProtocol Label Switching (MPLS) networks has increase significantly. These types of networks provide high bandwidth communications to a plurality of users at a low cost. Unfortunately, many of these networks do not have network connections readily available in a wide variety of location. Even when a connection to the network is available, the connection may not be secure.

Therefore there is a need for a system and method for connecting geographically distributed sites using a secure connection over a MPLS network.

SUMMARY OF THE INVENTION

A system and method for creating a secure link across an MPLS network is disclosed. An entry point into a communication system is mapped directly to a router in an MPLS network. The router attaches MPLS labels onto communication packets received from the entry point and transmits the packets across the MPLS network to a destination associated with the entry point. The router ignores any IP address contained in the packets when routing the packets through the MPLS network.

DETAILED DESCRIPTION OF THE PREFERRED EMBODIMENT

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
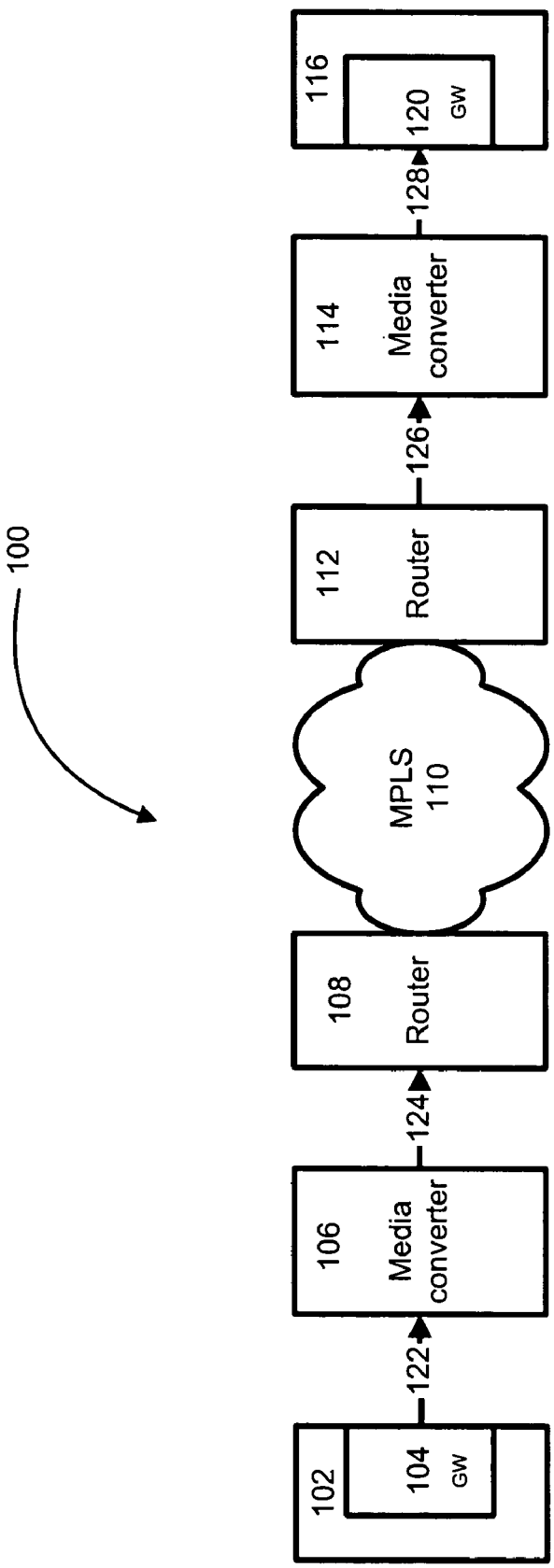
FIG. 1 is a block diagram of communication system 100 in one example embodiment of the invention.

FIG. 1 is a block diagram of communication system 100 in one example embodiment of the invention. Communication system 100 comprises a first site 102, a second site 116, a first media converter 106, a second media converter 114, a first router 108, a second router 112, and a MPLS network 110. The first site 102 may be geographically remote from the second site 116. A first Ethernet gateway 104 is located at the first site 102. A second Ethernet gateway 120 is located at the second site 116. The Ethernet gateways may be pseudo wire gateways. Pseudo wire is a connection oriented technology that provides a separate control plane and a separate data plane. A hacker would have to penetrate the management system of the control plane to break security when using pseudo wire gateways. The first Ethernet gateway 104 is coupled to the first media converter 106 with a first Ethernet tunnel 122. The first media converter 106 is coupled to the first router 108 with dedicated optical link 124. A dedicated optical link can be created by designating one or more specific wavelengths for use between two points, or using one or more dedicated fibers between the two points. The first router 108 is coupled to the second router 112 by MPLS network 110. The second router 112 is coupled to the second media converter 114 by a second dedicated optical link 126. The second media converter 114 is coupled to the second gateway 120 by Ethernet tunnel 128.

In operation, communications from the first site 102 are sent to the second site 116 using communication system 100. Gateway 104 may couple to equipment located at first site 104 using a variety of interfaces, for example TDM, Ethernet, POTS, RTS, or the like. Gateway 104 transfers communications from first site 102 to media converter 106 over Ethernet tunnel 122. Media converter 106 associates Ethernet tunnel 122 with gateway 104. Media converters are typically used to convert from one transmission medium to another, for example converting from wire to optical. Media converters may also be used to establish a terminating point for an Ethernet tunnel, even when the incoming and outgoing communications use the same type of transmission medium. Media converter 106 transmits the communications from gateway 104 to router 108 using dedicated optical link 124. Router 108 associates dedicated optical link 124 with media converter 106. Router 108 sends communications from media converter 106 to router 112 over MPLS network 110. Router 108 attaches MPLS labels to packets received from media converter 106 before sending the packets to router 112 over the MPLS network 110. The MPLS label attached to the packets by router 108 are associated with dedicated optical link 124. Router 108 is configured to drop any packets received from dedicated optical link 124 that already have an MPLS label attached. Dedicated optical link 124 terminates on a dedicated physical port in router 108. Router 108 may rate limit the communications received into the dedicated physical port. Router 112 strips the MPLS labels from packets received from router 108. Router 112 transmits the communications from router 108 to media converter 114 over dedicated optical link 126. Media converter 114 associates dedicated optical link 126 with router 112. Media converter 114 sends the communications from router 112 to gateway 120 over Ethernet tunnel 128. Gateway associates Ethernet tunnel 128 with media converter 114. Gateway 120 transfers the communications from media converter 114 to second site 116. Gateway 120 may couple to equipment located at second site 120 using a variety of interfaces, for example TDM, Ethernet, POTS, RTS, or the like.

Figure 2:
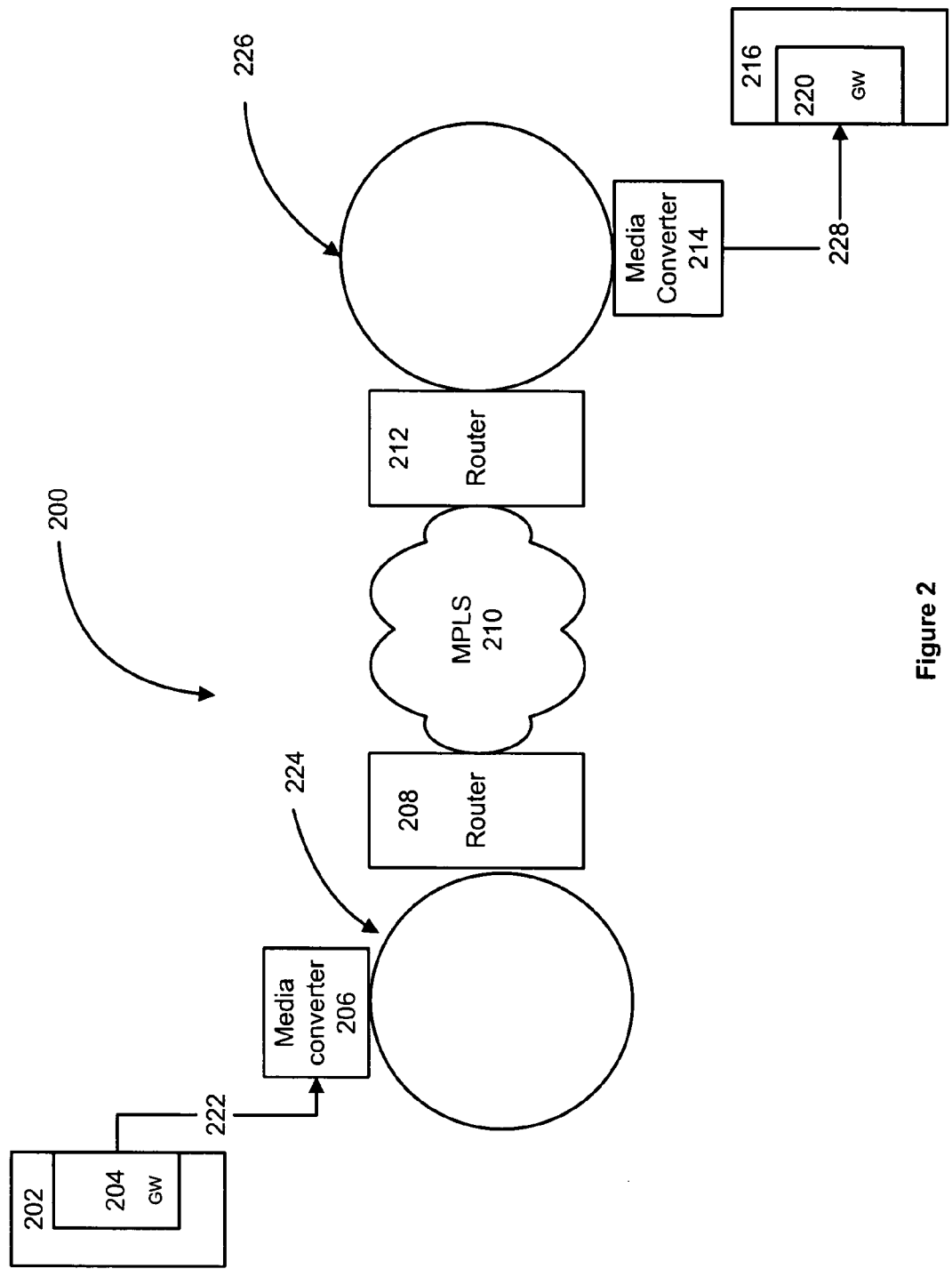
FIG. 2 is a block diagram of communication system 200 in one example embodiment of the invention.

FIG. 2 is a block diagram of communication system 200 in one example embodiment of the invention. Communication system 200 comprises a first site 202 and second site 216, media converter 206 and 214, router 208 and 212, Ethernet gateway 204 and 220, metropolitan area network (MAN) 224 and 226, and MPLS network 210. Metropolitan area networks are typically intra-city optical networks. Ethernet gateway 204 is located at the site 202. Ethernet gateway 220 is located at the site 216. The Ethernet gateways may be pseudo wire gateways. Ethernet gateway 204 may couple to equipment located at site 204 using a variety of interfaces, for example TDM, Ethernet, POTS, RTS, or the like. Ethernet gateway 204 is coupled to the media converter 206 with Ethernet tunnel 222. Media converter 206 is coupled to the router 208 over MAN 224. Media converter 206 uses a dedicated wavelength or a dedicated fiber in MAN 224 to couple to router 208 creating a dedicated optical link. The dedicated optical link terminates on a dedicated physical port in router 208. Router 208 is coupled to router 212 by MPLS network 210. Router 208 attaches MPLS labels to packets received from media converter 206 before sending the packets to router 212 over the MPLS network 210. The MPLS label attached to the packets by router 208 are associated with media converter 206. Router 208 is configured to drop any packets received from media converter 206 that already have an MPLS label attached. Router 212 is coupled to media converter 214 by MAN 226. The connection between router 212 and media converter 228 uses a dedicated wavelength or dedicated fiber in MAN 226. Media converter 114 is coupled to Ethernet gateway 220 by Ethernet tunnel 228. Ethernet gateway 220 is located on site 216.

Because the connection from site 202 to router 208 uses dedicated wavelengths or fibers and a dedicated Ethernet tunnel, router 208 knows that any communications received at it's dedicated physical port came from site 204. Router 204 can therefore automatically rout packages from it's dedicated physical port to site 220 over MPLS network 210 using a predetermined MPLS label.

MAN 224 and MAN 226 may only have a small number of access points into MPLS network 208 but may have a plurality of dedicated media converters placed around the MANs. Each media converter would be used to create a secure connection between a site located near the MAN with a remote site through MPLS network 210.

Figure 3:
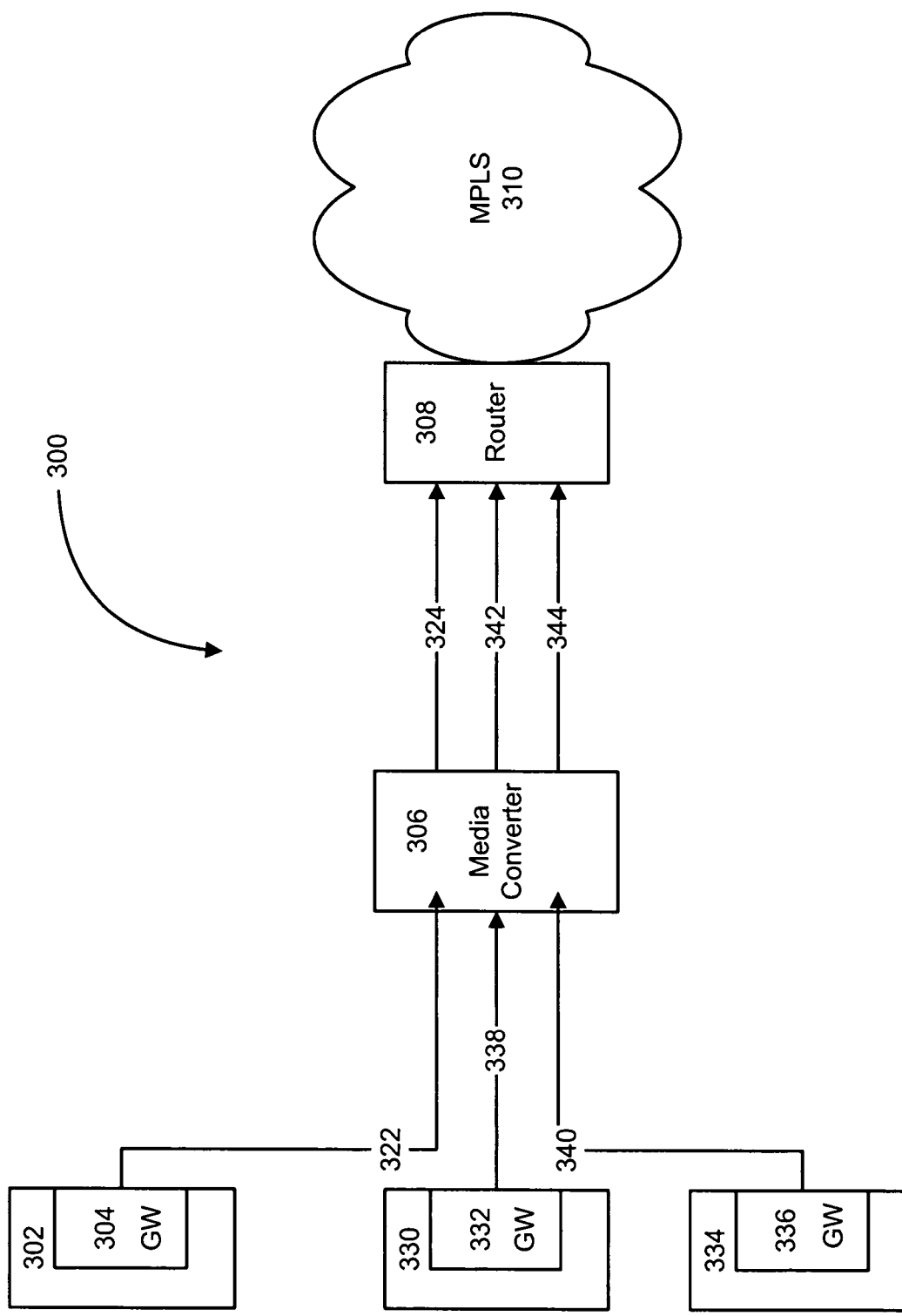
FIG. 3 is a block diagram of communication system 300 in an example embodiment of the invention.

FIG. 3 is a block diagram of communication system 300 in an example embodiment of the invention. Communication system 300 comprises sites 302, 330, and 334, gateways 304, 332, and 336, Ethernet tunnels 322, 338, and 340, media converter 306, optical links 324, 342, and 344, router 308, and MPLS network 310. Each site is connected to MPLS network using a dedicated link. The dedicated link comprises a dedicated Ethernet tunnel from the site to a media converter, and a dedicated optical link from the media converter to the router at the edge of the MPLS network. Each dedicated link terminates into a dedicated physical port in the router on the edge of the MPLS network.

Site 302 links to gateway 304. Gateway 304 may be a pseudo wire gateway. Gateway 304 sends the communications from site 302 to media converter 306 over dedicated Ethernet tunnel 322. Because the Ethernet tunnel is dedicated to gateway 304, any communications received by media converter 306 over Ethernet tunnel 322 came from site 302. Media converter 306 maps the communications from Ethernet tunnel 322 onto dedicated optical link 324. Dedicated optical link 324 may be a dedicated fiber between media converter 306 and the dedicated physical port on router 308, or may be a dedicated wavelength used only between media converter 306 and the dedicated physical port on router 308. Because the dedicated optical link is mapped directly from the dedicated Ethernet tunnel, any communications received by router 308 over dedicated optical link 324 came from site 302. Router 308 has a static mapping for each dedicated optical link. Any packets received from optical link 324 have a predetermined MPLS label attached and the packet is sent across the MPLS network 310 to its mapped destination. Any packets that router 308 receives over optical link 324 that already has an MPLS label attached is automatically dropped. The physical port that terminates optical link 324 may be rate limited. Because router 308 uses a direct mapping between optical link 324 and the MPLS label, any IP address contained in the packets are ignored. This helps create a secure link across MPLS network. Because the physical ports leading into router 308 are rate limited, flooding attacks can be reduced.

The sites linked together by the communication system of the current invention can be any type of site needing a secure link to any other site. Some examples include linking two geographically remote customer premises together. Another example includes linking a customer premise to a point of presence (POP) of a service provider. Another example is linking a cell site or base transceiver station (BTS) for a wireless service to a base station controller (BSC). Other types of sites may include Integrated Dispatch Enhanced Network (iDEN), Broadband Radio service (BRS), Wireless Metropolitan Network standards (WiMAX) base transceiver station (BTS), or the like.

When the communication system is used as a secure link between a cell site and a BTS, some packets may be encrypted for additional security. The traffic from a cell site is mostly voice data. The packet stream may also contain some data traffic. A small amount of the traffic is control information (typically less than 3 percent). In one example embodiment of the invention, the control information may be encrypted to increase the security of the link.

Figure 4:
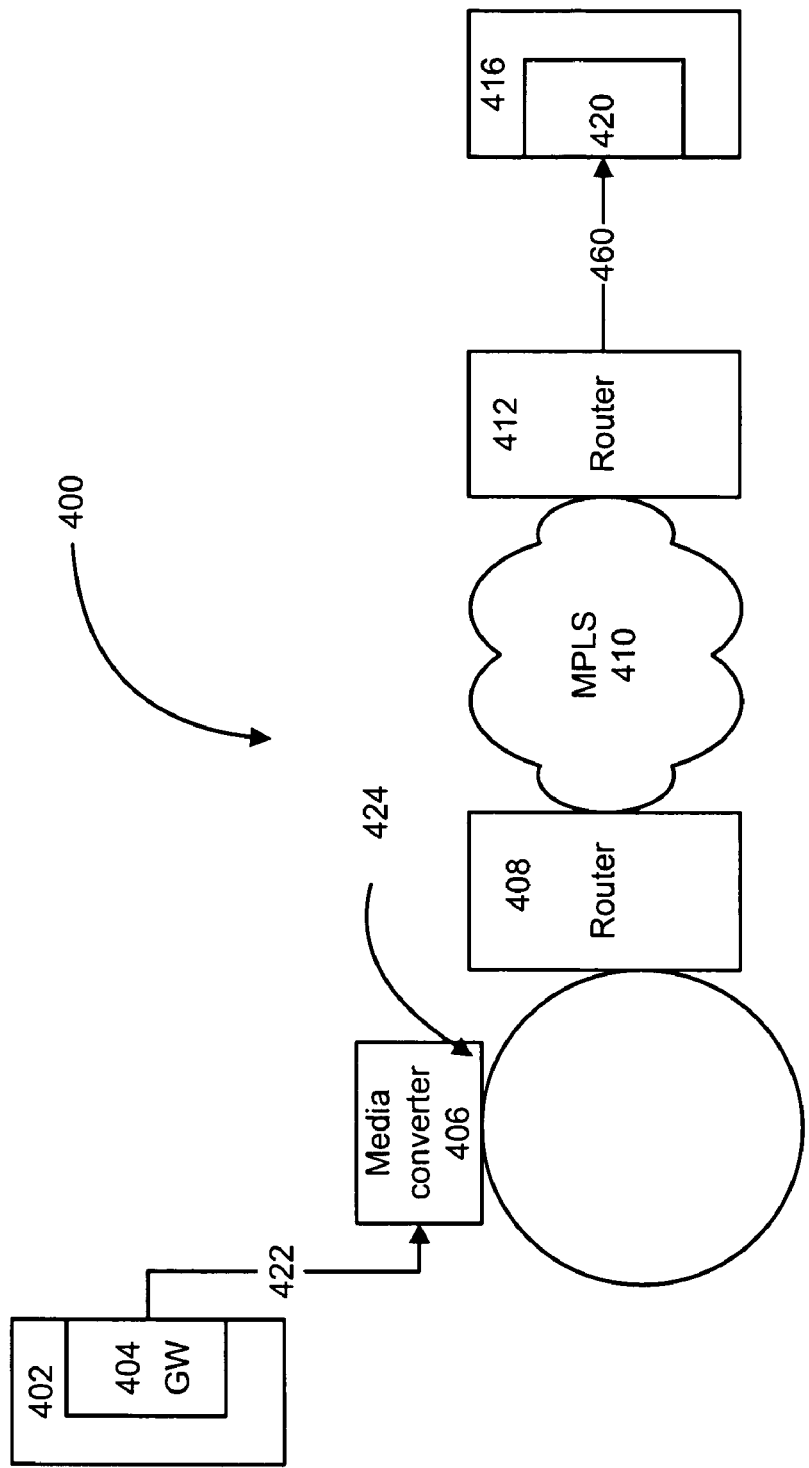
FIG. 4 is a block diagram of communication system 400 in an example embodiment of the invention.

The two entry points into the communication system do not need to have symmetrical paths. FIG. 4 is a block diagram of communication system 400 in an example embodiment of the invention. Communication system 400 comprises a first site 402 and second site 416, media converter 406, router 408 and 412, Ethernet gateway 404 and 420, metropolitan area network (MAN) 424, and MPLS network 410. Metropolitan area networks are typically intra-city optical networks. Ethernet gateway 404 is located at the site 402. Ethernet gateway 420 is located at the site 416. The Ethernet gateways may be pseudo wire gateways. Ethernet gateway 404 may couple to equipment located at site 404 using a variety of interfaces, for example TDM, Ethernet, POTS, RTS, or the like. Ethernet gateway 404 is coupled to the media converter 406 with Ethernet tunnel 422. Media converter 406 is coupled to router 408 over MAN 424. Media converter 406 uses a dedicated wavelength or a dedicated fiber in MAN 424 to couple to router 408. Router 408 is coupled to router 412 by MPLS network 410. Router 408 attaches MPLS labels to packets received from media converter 406 before sending the packets to router 412 over the MPLS network 410. The MPLS label attached to the packets by router 408 are associated with media converter 406. Router 408 is configured to drop any packets received from media converter 406 that already have an MPLS label attached. Router 412 is directly coupled to Ethernet gateway 420 by direct link 460. Ethernet gateway 420 is located on site 416.

I claim:

1. A communication system, comprising:
   a first gateway located at an entry point to the communication system;
   the first gateway coupled to a first media converter with a first dedicated Ethernet tunnel;
   the first media converter coupled to a first router using a first dedicated optical link, wherein the first router is part of a MultiProtocol Label Switching (MPLS) network;
   the first media converter configured to map any user communications received on the first dedicated Ethernet tunnel to the first dedicated optical link;
   the first dedicated optical link terminated at a dedicated physical port of the first router, wherein the router has a static mapping for the first dedicated optical link;
   the first router configured to attach an MPLS label associated with the dedicated physical port to user packets originating at the entry point when forwarding packets into the MPLS network, wherein addresses associated with the user packets originating at the entry point are ignored when attaching the MPLS label;
   the first router configured to remove MPLS labels from packets received from the MPLS network before forwarding the packets to the entry point;
   the first router configured to drop any packets received over the first dedicated optical link that already have an MPLS label attached.

2. The communication system of claim 1 where the first dedicated optical link uses at least one dedicated wavelength.

3. The communication system of claim 1 where the first dedicated optical link uses at least one dedicated fiber.

4. The communication system of claim 1 where the first dedicated physical port is rate limited.

5. The communication system of claim 1 where the entry point to the communication system is at a customer premises.

6. The communication system of claim 1 where the entry point to the communication system is a personal communication system (PCS) base transceiver station (BTS).

7. The communication system of claim 6 where packets containing control data exchanged with the PCS base transceiver station (BTS) are encrypted.

8. The communication system of claim 1 where the first gateway is a pseudo wire gateway.

9. The communication system of claim 1 where the first dedicated optical link is part of a metropolitan area network (MAN).

10. The communication system of claim 1, further comprising:
    a second gateway located at an exit point from the communication system;
    the second gateway coupled to a second media converter with a second dedicated Ethernet tunnel;
    the second media converter coupled to a second router using a second dedicated optical link where the router is part of the MultiProtocol Label Switching (MPLS) network;
    the second media converter configured to map any user communications received on the second dedicated Ethernet tunnel to the second dedicated optical link;
    the second dedicated optical link terminated at a dedicated physical port of the second router;
    the second router configured to attach a site specific MPLS label to user packets originating at the exit point when forwarding packets into the MPLS network, wherein addresses associated with the user packets originating at the exit point are ignored when attaching the site specific MPLS label;
    the router configured to remove site specific MPLS label from packets received from the MPLS network before forwarding the packets to the exit point;
    the router configured to drop any packets received over the second dedicated optical link that already have an MPLS label attached.

11. The communication system of claim 1 where the entry point to the communication system is an Integrated Dispatch Enhanced Network (iDEN).

12. The communication system of claim 1 where the entry point to the communication system is a Broadband Radio Service (BRS).

13. The communication system of claim 1 where the entry point to the communication system is a Wireless Metropolitan Area Network standards (WiMAX) base transceiver station (BTS).

14. A method of operating a communication system comprising:
    receiving user communications into a gateway;
    transferring the user communications from the gateway over a dedicated Ethernet tunnel to a media converter;
    receiving the user communication at the media converter and mapping the user communications onto a dedicated optical link;
    transferring the user communications over the dedicated optical link to a dedicated physical port of a router, wherein the router has a static mapping for the dedicated optical link;
    attaching an MPLS label associated with the dedicated physical port to packets in the user communications at the router, wherein addresses associated with the packets in the user communications are ignored when attaching the MPLS label;
    discarding packets in the user communications received over the dedicated optical link at the router that already have a MPLS label attached.

15. The method of operating communication system of claim 14 where the dedicated optical link uses at least one dedicated wavelength.

16. The method of operating communication system of claim 14 where the dedicated optical link uses at least one dedicated fiber.

17. The method of operating communication system of claim 14 further comprising:
    limiting an incoming rate of the user communications on the dedicated physical port.

18. The method of operating communication system of claim 14 where the entry point to the communication system is at a customer premises.

19. The method of operating communication system of claim 14 where the entry point to the communication system is a personal communication system (PCS) base transceiver station (BTS).

20. The method of operating communication system of claim 19 where packets containing control data exchanged with the PCS base transceiver station (BTS) are encrypted.

21. The method of operating communication system of claim 14 where the gateway is a pseudo wire gateway.

22. The communication system of claim 14 where the dedicated optical link is part of a metropolitan area network (MAN).

23. A method of creating a secure link into an MPLS network, comprising:
    creating a direct mapping between a gateway and a media converter using a dedicated Ethernet tunnel;
    creating a direct mapping between the media converter and a router using a dedicated optical link, wherein the router is part of a MPLS network, and wherein the router has a static mapping for the dedicated optical link;

mapping the dedicated Ethernet tunnel to the dedicated optical link;

receiving user communication packets over the dedicated optical link;

attaching a predetermined MPLS label associated with the dedicated optical link to the user communication packets, wherein addresses associated with the user communications packets are ignored when attaching the predetermined MPLS label;

routing the user communication packets through the MPLS network based on the attached MPLS label while ignoring any IP addresses that the packets may contain;

discarding communication packets received over the dedicated optical link that already have an MPLS label attached.

* * * * *